US009641433B2

(12) United States Patent
Sun et al.

(10) Patent No.: US 9,641,433 B2
(45) Date of Patent: May 2, 2017

(54) METHOD, ROUTING BRIDGE, AND SYSTEM FOR SENDING PACKET

(71) Applicant: Huawei Technologies Co., Ltd., Shenzhen (CN)

(72) Inventors: Xingguo Sun, Nanjing (CN); Kang Zi, Nanjing (CN); Wei Chen, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 54 days.

(21) Appl. No.: 14/679,541

(22) Filed: Apr. 6, 2015

(65) Prior Publication Data
US 2015/0215205 A1    Jul. 30, 2015

Related U.S. Application Data

(63) Continuation of application No. PCT/CN2013/084631, filed on Sep. 29, 2013.

(30) Foreign Application Priority Data

Oct. 11, 2012 (CN) .......................... 2012 1 0384620

(51) Int. Cl.
*H04L 12/46* (2006.01)
*H04L 12/713* (2013.01)
(Continued)

(52) U.S. Cl.
CPC ............ *H04L 45/74* (2013.01); *H04L 5/0044* (2013.01); *H04L 12/46* (2013.01); *H04L 12/462* (2013.01);
(Continued)

(58) Field of Classification Search
CPC ... H04L 12/462; H04L 61/103; H04L 5/0044; H04L 45/586; H04L 45/74; H04L 12/46; H04W 88/16
See application file for complete search history.

(56) References Cited

U.S. PATENT DOCUMENTS 7,881,208 B1     2/2011 Nosella et al.
2012/0014386 A1*  1/2012 Xiong .............. H04L 29/12028
                                                    370/392
(Continued)

FOREIGN PATENT DOCUMENTS

CN      102404181 A      4/2012
CN      102404216 A      4/2012
(Continued)

OTHER PUBLICATIONS

Cisco Systems: "Gateway Load Balancing Protocol Overview," Internet Citation, XP002585458, 2004, 25 pages.
(Continued)

*Primary Examiner* — Brian D Nguyen
(74) *Attorney, Agent, or Firm* — Slater Matsil, LLP (57) ABSTRACT

The present invention discloses a method, routing bridge, and system for sending a packet, which are applied to the field of communications technologies, and are invented to reduce a signaling overhead of a TRILL network. The method includes: receiving, by a first transit RB, a Nickname of an edge RB sent by a second transit RB; constructing, an address advertisement message, where the address advertisement message includes a virtual IP address and a virtual MAC address of the first transit RB; and sending, the address advertisement message to the edge RB according to the Nickname of the edge RB, so that the edge RB sends, after receiving the address advertisement message, a free ARP packet to a server that accesses the TRILL network
(Continued)

through the edge RB, where the free ARP packet includes a correspondence between the virtual MAC address and the virtual IP address.

19 Claims, 6 Drawing Sheets

(51) Int. Cl.
    *H04L 12/741* (2013.01)
    *H04L 29/12* (2006.01)
    *H04L 5/00* (2006.01)
    *H04W 88/16* (2009.01)

(52) U.S. Cl.
    CPC .......... *H04L 45/586* (2013.01); *H04L 61/103* (2013.01); *H04W 88/16* (2013.01)

(56) References Cited

U.S. PATENT DOCUMENTS

| | | | | |
|---|---|---|---|---|
| 2012/0281700 | A1* | 11/2012 | Koganti | ................. H04L 49/60 370/392 |
| 2013/0003738 | A1* | 1/2013 | Koganti | ................. H04L 61/103 370/392 |
| 2013/0100851 | A1* | 4/2013 | Bacthu | ................. H04L 12/4641 370/254 |
| 2013/0138832 | A1 | 5/2013 | Qi et al. | |
| 2013/0188514 | A1* | 7/2013 | Jain | ................. H04L 61/103 370/254 |
| 2013/0294451 | A1 | 11/2013 | Li et al. | |
| 2013/0301642 | A1* | 11/2013 | Radhakrishnan | ....... H04L 45/66 370/392 |

FOREIGN PATENT DOCUMENTS

| | | |
|---|---|---|
| CN | 102510414 A | 6/2012 |
| CN | 102882781 A | 1/2013 |
| EP | 2600573 A1 | 6/2013 |
| JP | 2013535870 A | 9/2013 |
| WO | 2012006198 A2 | 1/2012 |

OTHER PUBLICATIONS

Zhai, H., et al., "Extending the Virtual Router Redundancy Protocol for TRILL Campus; Draft-Hu-Trill-Rbridge-VRRP-02.txt," Standards Track, Dec. 30, 2011, 12 pages.

* cited by examiner

METHOD, ROUTING BRIDGE, AND SYSTEM FOR SENDING PACKET

This application is a continuation of International Application No. PCT/CN2013/084631, filed on Sep. 29, 2013, which claims priority to Chinese Patent Application No. 201210384620.0, filed on Oct. 11, 2012, both of which are hereby incorporated by reference in their entireties.

TECHNICAL FIELD

The present invention relates to the field of communications technologies, and in particular, to a method, routing bridge, and system for sending a packet.

BACKGROUND

At present, with rapid popularization of networks and increasingly deepening of applications, various value-added services are widely deployed on networks, network bandwidth is increased exponentially, and network load balancing has increasingly become a focus of people's attention. A multi-gateway load balancing protocol is a protocol that is applied widely at present and can effectively solve a network load problem.

The Transparent Interconnection of Lots of Links (TRILL) protocol is a routing protocol based on link state calculation on a layer-2 network. The TRILL protocol is implemented by using the Intermediate System to Intermediate System (IS-IS) protocol, a device that runs the TRILL protocol is called a routing bridge (Routing Bridge) device, and a network formed by RBs is called a TRILL network (TRILL Campus). The RBs on the TRILL network, from a functional perspective, may be categorized into transit RBs and edge RBs. Each edge RB is responsible for routing data traffic forwarded by dozens of and even hundreds of servers. Each transit RB may route data traffic forwarded by multiple edge RBs. Edge RBs are categorized into ingress RBs and egress RBs. When an edge RB receives traditional layer-2 traffic sent by a server, encapsulates the received traditional layer-2 traffic by using the TRILL protocol, and sends encapsulated traditional layer-2 traffic to the internal of a TRILL network, the edge RB is an ingress RB; when an edge RB receives TRILL data traffic forwarded by a TRILL network, decapsulates and restores the received TRILL data traffic to traditional layer-2 traffic by using TRILL, and sends the traditional layer-2 traffic to a server, the edge RB is an egress RB. A typical TRILL network architecture includes a transit RB, an edge RB, and many servers. An RB on a TRILL network may be identified by a Nickname. A Nickname cannot be repeated on an entire network, and may be automatically generated or manually configured. Each RB establishes a unicast route that is based on a Nickname of another RB, and mutual communication may be implemented between different RBs through a Nickname-based unicast route.

In a TRILL network architecture nowadays, a multi-gateway load balancing protocol is generally used to perform traffic load balancing, that is, multiple transit RBs share a virtual Internet Protocol (IP) address, a transit RB is elected by negotiation, as an active virtual gateway, from multiple transit RBs, and the active virtual gateway separately allocates different virtual medium access control (MAC) addresses to other transit RBs. One virtual MAC address is allocated to each transit RB. Different servers separately establish connections, according to the different virtual MAC addresses, to different transit RBs through edge RBs, and separately send traditional layer-2 traffic to the different transit RBs, so that the transit RBs evenly share traffic load, thereby expanding TRILL network bandwidth, and avoiding a problem of TRILL network breakdown caused by a fault with an important RB (a transit RB that is mainly responsible for traffic load). An active virtual gateway establishes an information table of a server that is connected to each transit RB. When a transit RB is faulty, to ensure that a server connected to the transit RB properly accesses a TRILL network, the active virtual gateway sends information of the server connected to the transit RB to another transit RB. The another transit RB sends, by unicasting, an Address Resolution Protocol (ARP) packet to a server corresponding to the received information of the server. By using an ARP packet to notify newly connected servers of its virtual MAC address, a transit RB enables these servers to properly access a TRILL network.

In the foregoing scenario of multi-gateway load balancing on a TRILL network, the inventor finds that in the prior art at least the following problems exist:

A large quantity of servers access the TRILL network. When there are many servers connected to the faulty RB and these servers access the TRILL network through a new transit RB, the new transit RB sends, by unicasting, an ARP packet to each newly connected server; in this case, a lot of resources of the TRILL network are wasted, and particularly in a fault recovery scenario, a lot of resource overheads prolong fault recovery time and reduce fault recovery efficiency.

SUMMARY

Embodiments of the present invention provide a method, routing bridge, and system for sending a packet, so as to resolve a problem of TRILL network resource waste that is caused when a transit RB on the TRILL network is faulty, servers connected to the transit RB access the TRILL network through a new transit RB, and the new transit RB sends an ARP packet to each server on which a faulty connection occurs.

According to a first aspect, a method for sending a packet is provided, where the method is applicable to a TRILL network. The method includes receiving, by a first transit RB, a Nickname of an edge RB sent by a second transit RB and constructing an address advertisement message at the first transit RB. The address advertisement message includes a virtual IP address and a virtual MAC address of the first transit RB. The method further includes sending, by the first transit RB, according to the Nickname of the edge RB, the address advertisement message to the edge RB. The edge RB is configured to send, after receiving the address advertisement message, a free ARP packet to a server that accesses the TRILL network through the edge RB. The free ARP packet includes a correspondence between the virtual MAC address and the virtual IP address.

In a first possible implementation manner of the first aspect, the address advertisement message is an extended TRILL packet, and a specific extension manner of the extended TRILL packet is that the virtual IP address and the virtual MAC address are carried in a Payload field of the extended TRILL packet.

In the first aspect or a first possible implementation manner of the first aspect, a second possible implementation manner of the first aspect is further provided. In the second possible implementation manner of the first aspect, the first transit RB is an active virtual forwarder device on the TRILL network and the second transit RB is an active virtual gateway device on the TRILL network.

According to a second aspect, a method for sending a packet is provided, where the method is applicable to a TRILL network, and the method includes receiving, by an edge RB, an address advertisement message sent by a transit RB, where the address advertisement message includes a virtual IP address and a virtual MAC address of the transit RB, and constructing a free ARP packet. The free ARP packet includes a correspondence between the virtual IP address and the virtual MAC address. The method further includes sending, by the edge RB, the free ARP packet to a server that accesses the TRILL network through the edge RB.

In a first possible implementation manner of the second aspect, the address advertisement message is an extended TRILL packet, and a specific extension manner of the extended TRILL packet is that the virtual IP address and the virtual MAC address are added to a Payload field of the extended TRILL packet.

According to a third aspect, a first transit RB for sending a packet is provided, where the first transit RB is applicable to a TRILL network, the TRILL network includes the first transit RB and a second transit RB, and the first transit RB includes a receiving unit, configured to receive a Nickname of an edge RB sent by the second transit RB; a processing unit, configured to construct an address advertisement message, where the address advertisement message includes a virtual IP address and a virtual MAC address of the transit RB; and a sending unit, configured to send, according to the Nickname of the edge RB received by the receiving unit, the address advertisement message constructed by the processing unit to the edge RB, so that the edge RB sends, after receiving the address advertisement message, a free ARP packet to a server that accesses the TRILL network through the edge RB, where the free ARP packet includes a correspondence between the virtual MAC address and the virtual IP address.

In a first possible implementation manner of the third aspect, the address advertisement message constructed by the processing unit is an extended TRILL packet, and a specific extension manner of the extended TRILL packet is that the virtual IP address and the virtual MAC address are added to a Payload field of the extended TRILL packet.

In the third aspect or the first possible implementation manner of the third aspect, a second possible implementation manner of the third aspect is further provided. In the second possible implementation manner of the third aspect, the first transit RB is an active virtual forwarder device on the TRILL network and the second transit RB is an active virtual gateway device on the TRILL network.

According to a fourth aspect, an edge RB for sending a packet is provided, where the edge RB is applicable to a TRILL network, and the edge RB includes a receiving unit configured to receive an address advertisement message sent by a transit RB. The address advertisement message includes a virtual IP address and a virtual MAC address of the transit RB. A processing unit is configured to construct, according to the address advertisement message, a free ARP packet, where the free ARP packet includes a correspondence between the virtual IP address and the virtual MAC address. A sending unit is configured to send the free ARP packet constructed by the processing unit to a server that accesses the TRILL network through the edge RB.

According to a fifth aspect, a system for sending a packet is provided, where the system is applicable to a TRILL network and the system includes: a first transit RB and an edge RB. The first transit RB includes a first receiving unit configured to receive a Nickname of an edge RB sent by a second transit RB; a first processing unit, configured to construct an address advertisement message; and a first sending unit, configured to send according to the Nickname of the edge RB received by the first receiving unit, the address advertisement message to the edge RB. The address advertisement message includes a virtual IP address and a virtual MAC address of the first transit RB. The edge RB includes a second receiving unit configured to receive the address advertisement message sent by the first sending unit of the first transit RB; a second processing unit configured to construct, according to the address advertisement message, a free ARP packet, where the free ARP packet includes a correspondence between the virtual IP address and the virtual MAC address; and a second sending unit, configured to send the free ARP packet constructed by the second processing unit to a server that accesses the TRILL network through the edge RB.

To sum up, according to the foregoing technical solutions, on a TRILL network, when a transit RB is faulty, to ensure that a server connected to the transit RB properly accesses the TRILL network, a second RB, as an active virtual gateway, sends a Nickname of an edge RB to a first RB, and the first transit RB sends, by unicasting, according to the Nickname of the edge RB, an address advertisement message to the edge RB, where the address advertisement message includes a virtual IP address and a virtual MAC address of the first transit RB, so that the edge RB sends, after receiving the address advertisement message, on a traditional layer-2 network, by using a free ARP packet, a correspondence between the virtual IP address of the first transit RB and the virtual MAC address of the first transit RB to a server connected to the faulty transit RB, thereby enabling the foregoing server to establish a connection to the first transit RB and properly access the TRILL network, and, in comparison with the prior art, effectively reducing, on the TRILL network, a quantity of messages sent for advertising addresses and reducing occupation of TRILL network resources.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 2 (*a*) and FIG. 2 (*b*) are flowcharts of two methods for sending a packet according to an embodiment of the present invention;

DETAILED DESCRIPTION OF ILLUSTRATIVE EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To better describe embodiments of the present invention, the following first briefly introduces a multi-gateway load balancing architecture, of a TRILL network, on which the embodiments of the present invention are based.

Figure 1:
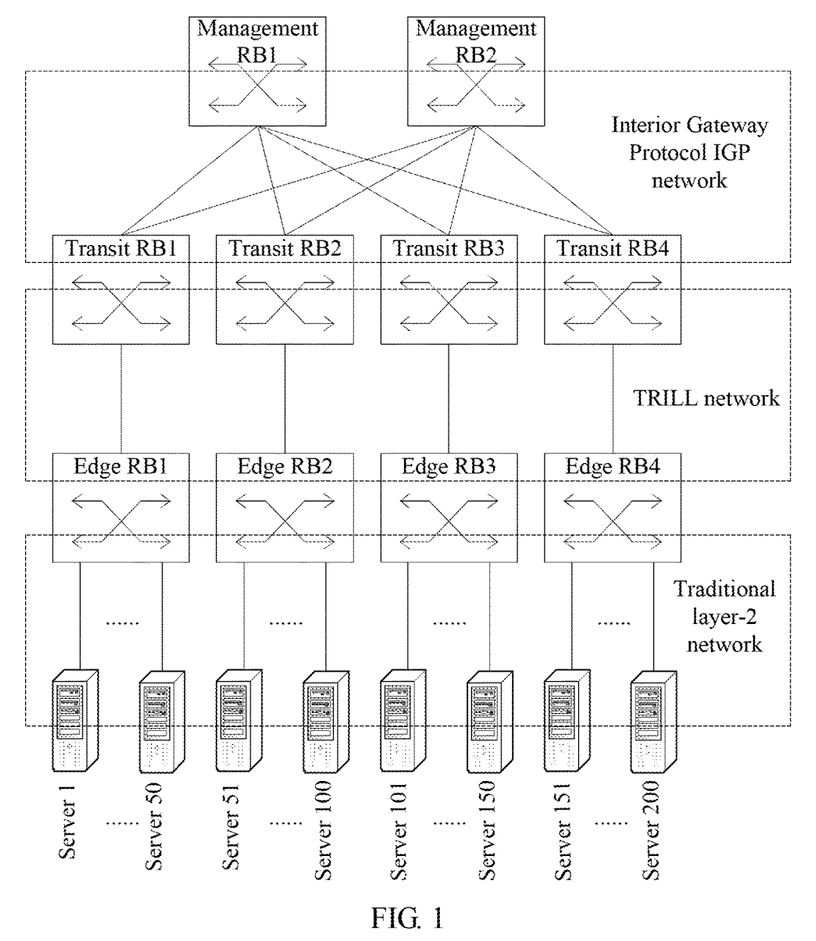
FIG. 1 is a schematic diagram of a network architecture of multi-gateway load balancing on a TRILL network according to an embodiment of the present invention.

In a network architecture shown in FIG. 1, a management RB1 and a management RB2 form a top switching layer, a transit RB1, a transit RB2, a transit RB3, and a transit RB4 form an upper switching layer, and RBs from an edge RB1 to an edge RB4 form a lower switching layer, where 50 servers are connected to each edge RB. An Interior Gateway Protocol (IGP) network is formed between the management RBs and the transit RBs, a TRILL network is formed between the transit RBs and the edge RBs, and a traditional layer-2 network is formed between the edge RBs and the servers. The following uses an example to describe a process in which a server forwards a packet through a TRILL network:

A traditional layer-2 packet sent by a server is encapsulated with a TRILL header by an edge RB that is connected to the server to form a TRILL packet, which is forwarded to a transit RB, the transit RB forwards the TRILL packet to a management RB, the management RB forwards the TRILL packet to another transit RB, the another transit RB forwards the TRILL packet to another edge RB, and the another edge RB decapsulates the TRILL packet to a traditional layer-2 packet and forwards the traditional layer-2 packet to a server connected to the another edge RB. Therefore, a TRILL network data forwarding process is completed. For example, in FIG. 1, a traditional layer-2 packet sent by a server 1 is encapsulated with a TRILL header by an edge RB1 that is connected to the server1 to form a TRILL packet, which is forwarded to a transit RB1, the transit RB1 forwards the TRILL packet to a management RB1, the management RB1 forwards the TRILL packet to a transit RB3, the transit RB3 forwards the TRILL packet to an edge RB3, and the edge RB3 decapsulates the TRILL packet to a traditional layer-2 packet and forwards the traditional layer-2 packet to a server 150.

In a multi-gateway load balancing scenario, RBs from a transit RB1 to a transit RB4 share a same virtual IP address, the transit RB1, as an active virtual gateway, separately allocates a virtual AMC address to itself and other three transit RBs that serve as active virtual forwarders, and an allocated virtual MAC address is used by a server to send a data packet to a transit RB through an edge RB. For example, the transit RB1 allocates a virtual MAC address 1 to itself and allocates a virtual MAC address 2 to the transit RB2; and 50 servers connected to an edge RB1 send, according to a correspondence between the virtual MAC address 1 and a virtual IP address, data packets to the transit RB1, and 50 servers connected to an edge RB2 send, according to a correspondence between the virtual MAC address 2 and a virtual IP address, data packets to the transit RB2. An active virtual gateway implements multi-gateway load balancing of a TRILL network by allocating virtual MAC addresses to active virtual forwarders.

The following describes the embodiments of the present invention with reference to the multi-gateway load balancing network architecture of the TRILL network shown in FIG. 1.

Figure 2:
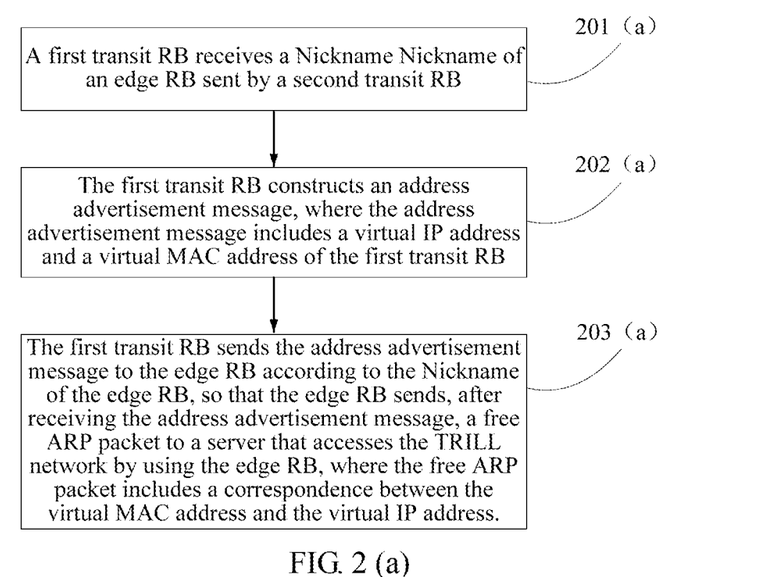

An embodiment of the present invention provides a method for sending a packet. As shown in FIG. 2 (*a*), the method includes the following steps.

201*a*: A first transit RB receives a Nickname of an edge RB sent by a second transit RB.

Optionally, the first transit RB is an active virtual forwarder on the TRILL network and may be any one of the RBs from the transit RB2 to the transit RB4 shown in FIG. 1, and the second transit RB is an active virtual gateway on the TRILL network and may be the transit RB1 shown in FIG. 1.

The Nickname of the edge RB is a user identifier of the edge RB and is used to uniquely identify the edge RB.

Optionally, the second transit RB may send the Nickname of the edge RB to the first transit RB by adding the Nickname of the edge RB to a payload (Payload) field of a TRILL packet.

202*a*: The first transit RB constructs an address advertisement message, where the address advertisement message includes a virtual IP address and a virtual MAC address of the first transit RB.

Optionally, the address advertisement message is an extended TRILL packet, and a specific extension manner of the extended TRILL packet is that the virtual IP address and the virtual MAC address are added to a Payload field of the extended TRILL packet.

203*a*: The first transit RB sends the address advertisement message to the edge RB according to the Nickname of the edge RB, so that the edge RB sends, after receiving the address advertisement message, a free ARP packet to a server that accesses the TRILL network through the edge RB, where the free ARP packet includes a correspondence between the virtual MAC address and the virtual IP address.

The first transit RB saves in advance a unicast route that is based on the Nickname of the edge RB and sends the address advertisement message to the edge RB according to the unicast route. After receiving the address advertisement message, the edge RB advertises, in a form of a free ARP packet, the correspondence between the virtual MAC address included in the address advertisement message and the virtual IP address included in the address advertisement message, to a server connected to the edge RB. After receiving the free ARP packet, the server establishes an ARP entry that includes the correspondence between the virtual IP address and the virtual MAC address, and then the server may send a data packet to the first transit RB by using the ARP entry.

For example, in FIG. 1, after receiving an address advertisement message sent by the transit RB2, the edge RB2 sends a free ARP packet to the 50 servers connected to the edge RB2, where the free ARP packet includes the virtual MAC address and the virtual IP address carried in the address advertisement message. The edge RB2 sends, by using the free ARP packet, by broadcasting, a correspondence between the virtual MAC address and the virtual IP address to the 50 servers connected to the edge RB2, so that these servers forward, according to the correspondence between the virtual MAC address and the virtual IP address, data packets to the transit RB2 through the edge RB2.

Optionally, after the second transit RB initially allocates a virtual MAC address to the first transit RB, the first transit RB performs step 201*a* to step 203*a* in sequence to acquire a Nickname of an edge RB and send, according to a Nickname of the edge RB, its virtual IP address and virtual MAC address to the edge RB by using an address advertisement message. Alternatively, when a transit RB is faulty, the second transit RB sends a Nickname of an edge RB corresponding to the faulty transit RB to the first transit RB, and the first transit RB performs step 201*a* to step 203*a* in sequence to send its virtual IP address and virtual MAC address to the edge RB by using an address advertisement message.

The Nickname in this embodiment of the present invention is a Nickname of an edge RB and is used to uniquely identify the edge RB; in addition, the Nickname may also be a Nickname of a server, and a Nickname is used to uniquely identify a server. Nicknames of servers connected to a same edge RB have a same field feature, and a Nickname of an edge RB connected to a server may be acquired by using a Nickname of the server.

The method for sending a packet according to this embodiment of the present invention, in comparison with the prior art, may reduce a quantity of messages sent for advertising addresses on a TRILL network. A scenario in which a virtual MAC address of a first transit RB is initialized is used as an example. In the network architecture shown in FIG. 1, it is assumed that virtual MAC addresses that are allocated to the RBs from the transit RB1 to the transit RB4 by the transit RB1 are virtual MAC addresses from a virtual MAC address 1 to a virtual MAC address 4 in sequence, then a server connected to the edge RB1 forwards data to the transit RB1 according to the virtual MAC address 1, and servers connected to the edge RB2, the edge RB3, and the edge RB4 forward data, in a same manner, to the transit RB2, transit RB3, and transit RB4 respectively according to the virtual MAC address 2, the virtual MAC address 3, and the virtual MAC address 4 respectively. In the prior art, after acquiring an allocated virtual MAC address, a transit RB needs to send, by unicasting, an address advertisement message ARP packet to all servers connected to an edge RB that is connected to the transit RB. Because RBs from the edge RB1 to the edge RB4 are separately connected to 50 servers, a quantity of ARP packets sent by each transit RB is 50, that is the transit RB1 to the transit RB4 send a total of 200 ARP packets on the TRILL network. In this embodiment of the present invention, however, a transit RB only needs to send an address advertisement message to an edge RB according to a Nickname of the edge RB, and the edge RB sends, by broadcasting, on a traditional layer-2 network, a free ARP packet to 50 servers connected to the edge RB, that is, the RBs from the transit RB1 to the transit RB4 send a total of only 4 address advertisement messages on the TRILL network. In comparison with the prior art, the method for sending a packet according to this embodiment of the present invention, may reduce a quantity of address advertisement messages sent on the TRILL network and reduce a resource overhead on the TRILL network.

Further, an embodiment of the present invention provides a method for sending a packet. As shown in FIG. 2 (*b*), the method includes the following steps:

201*b*: An edge RB receives an address advertisement message sent by a transit RB, where the address advertisement message includes a virtual IP address and a virtual MAC address of the transit RB.

Optionally, the edge RB is any one of the edge RB1 to the RB4 shown in FIG. 1, and a Nickname of the edge RB is a user identifier of the edge RB and is used to uniquely identify the edge RB.

A first transit RB constructs an address advertisement message, where the address advertisement message includes a virtual IP address and a virtual MAC address of the first transit RB. The edge RB receives the address advertisement message sent by the first transit RB to acquire the virtual IP address and the virtual MAC address of the first transit RB.

Optionally, the address advertisement message is an extended TRILL packet, and a specific extension manner of the extended TRILL packet is that the virtual IP address and the virtual MAC address are added to a Payload field of the extended TRILL packet.

Specifically, the first transit RB saves in advance a unicast route that is based on the Nickname of the edge RB and sends the address advertisement message to the edge RB according to the unicast route.

Optionally, after a second transit RB initially allocates a virtual MAC address to the first transit RB, the first transit RB performs step 201*a* to step 203*a* in sequence to acquire a Nickname of an edge RB and send, according to the Nickname of the edge RB, its virtual IP address and virtual MAC address to the edge RB by using an address advertisement message. Alternatively, when a transit RB is faulty, the second transit RB sends a Nickname of an edge RB corresponding to the faulty transit RB to the first transit RB, and the first transit RB performs step 201*a* to step 203*a* in sequence to send its virtual IP address and virtual MAC address to the edge RB by using an address advertisement message.

The Nickname in this embodiment of the present invention is a Nickname of an edge RB and is used to uniquely identify the edge RB; in addition, the Nickname may also be a Nickname of a server, and a Nickname is used to uniquely identify a server. Nicknames of servers connected to a same edge RB have a same field feature, and a Nickname of an edge RB connected to a server may be acquired by using a Nickname of the server.

202*b*: The edge RB constructs a free ARP packet, where the free ARP packet includes a correspondence between the virtual IP address and the virtual MAC address.

After receiving the address advertisement message, the edge RB constructs, the free ARP packet, where the free ARP packet includes the correspondence between the virtual MAC address included in the address advertisement message and the virtual IP address included in the address advertisement message.

203*b*: The edge RB sends the free ARP packet to a server that accesses a TRILL network through the edge RB.

After receiving the address advertisement message, the edge RB advertises, in a form of a free ARP packet, the correspondence between the virtual MAC address included in the address advertisement message and the virtual IP address included in the address advertisement message, to the server connected to the edge RB. After receiving the free ARP packet, the server establishes an ARP entry that includes the correspondence between the virtual IP address and the virtual MAC address, and then the server may send a data packet to the first transit RB by using the ARP entry.

For example, in FIG. 1, after receiving an address advertisement message sent by the transit RB2, the edge RB2 sends a free ARP packet to the 50 servers connected to the edge RB2, where the free ARP packet includes the virtual MAC address and the virtual IP address carried in the address advertisement message. The edge RB2, by using the free ARP packet, sends, by broadcasting, a correspondence between the virtual MAC address and the virtual IP address to the 50 servers connected to the edge RB2, so that these servers forward, according to the correspondence between the virtual MAC address and the virtual IP address, data packets to the transit RB2 through the edge RB2.

The method for sending a packet according to this embodiment of the present invention, in comparison with the prior art, may reduce a quantity of messages sent for advertising addresses on a TRILL network. A scenario in which a virtual MAC address of a first transit RB is initialized is used as an example. In the network architecture shown in FIG. 1, it is assumed that virtual MAC addresses that are allocated to the RBs from the transit RB1 to the transit RB4 by the transit RB1 are virtual MAC addresses from a virtual MAC address 1 to a virtual MAC address 4 in sequence, then a server connected to the edge RB1 forwards data to the transit RB1 according to the virtual MAC address 1, and servers connected to the edge RB2, the edge RB3, and the edge RB4 forward data to the transit RB2, the transit RB3, and the transit RB4 respectively according to the virtual MAC address 2, the virtual MAC address 3, and the virtual MAC address 4 respectively. In the prior art, after acquiring an allocated virtual MAC address, a transit RB needs to send, by unicasting, an address advertisement message ARP packet to all servers connected to an edge RB that is connected to the transit RB. Because the edge RB1 to the edge RB4 are separately connected to 50 servers, a quantity of ARP packets sent by each transit RB is 50, that is the RBs from the transit RB1 to the transit RB4 send a total of 200 ARP packets on the TRILL network. In this embodiment of the present invention, however, a transit RB only needs to send an address advertisement message to an edge RB according to a Nickname of the edge RB, and the edge RB sends, by broadcasting, on a traditional layer-2 network, a free ARP packet to 50 servers connected to the edge RB, that is, the RBs from the transit RB1 to the transit RB4 send a total of only 4 address advertisement messages on the TRILL network. In comparison with the prior art, the method for sending a packet according to this embodiment of the present invention, may reduce a quantity of address advertisement messages sent on the TRILL network and reduce a resource overhead on the TRILL network.

Figure 3:
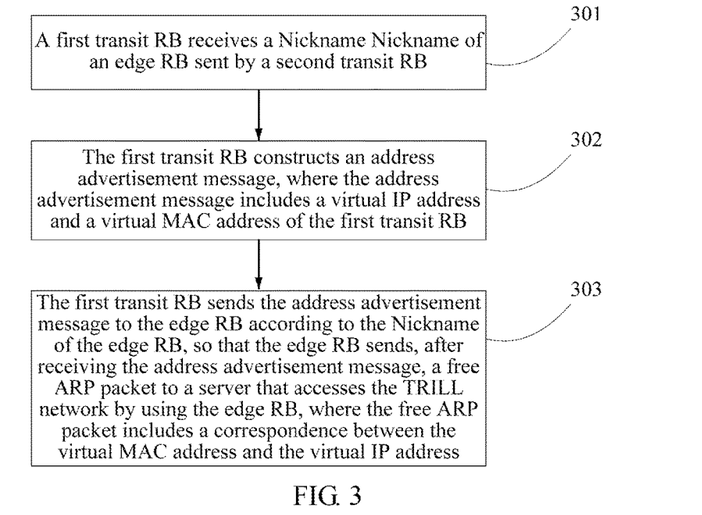
FIG. 3 is a flowchart of another method for sending a packet according to an embodiment of the present invention.

Further, as a description of the embodiments shown in FIG. 2 (*a*) and FIG. 2 (*b*), an embodiment of the present invention further provides a method for sending a packet. As shown in FIG. 3, the method includes the following steps.

301: A first transit RB receives a Nickname of an edge RB sent by a second transit RB.

302: The first transit RB constructs an address advertisement message, where the address advertisement message includes a virtual IP address and a virtual MAC address of the first transit RB.

Figure 4:
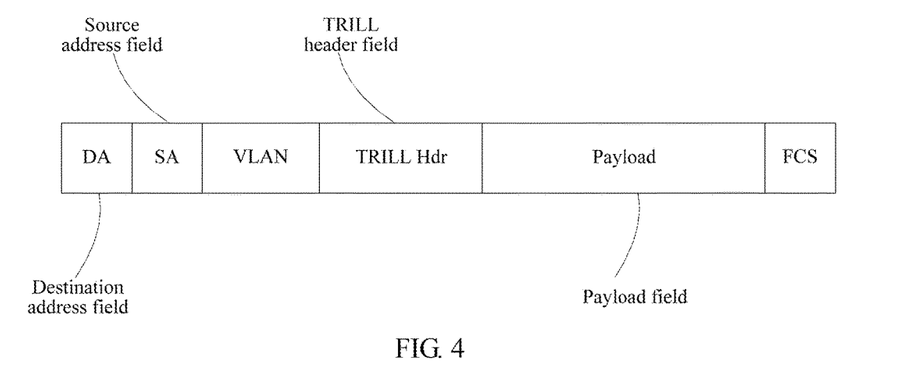
FIG. 4 is a schematic diagram of a format of a TRILL packet according to an embodiment of the present invention.

Optionally, the address advertisement message is an extended TRILL packet, and a specific extension manner of the extended TRILL packet is shown in FIG. 4, where a TRILL Hdr field is a header of the TRILL packet, an SA (Source Address) field is a source address and is an address of the first transit RB in this embodiment of the present invention, a DA (Destination Address) field is a destination address and is filled with an address of the edge RB in this embodiment of the present invention, and the virtual IP address and the virtual MAC address are carried in a Payload field of the extended TRILL packet. When an Ethernet packet is also encapsulated in the extended TRILL packet, the virtual IP address and the virtual MAC address may be carried in a payload (Ethernet Payload) field of the Ethernet packet. When an Intermediate System to Intermediate System (IS-IS) packet is also encapsulated in the extended TRILL packet, the virtual IP address and the virtual MAC address may be carried in a payload (IS-IS Payload) field of the IS-IS packet.

303: The first transit RB sends the address advertisement message to the edge RB according to the Nickname of the edge RB, so that the edge RB sends, after receiving the address advertisement message, a free ARP packet to a server that accesses the TRILL network through the edge RB, where the free ARP packet includes a correspondence between the virtual MAC address and the virtual IP address.

Optionally, a flag field may also be included in the Payload of the extended TRILL packet. When determining, after receiving the address advertisement message, that the flag field is included, the edge RB advertises, in a form of a free ARP packet, the correspondence between the virtual MAC address included in the address advertisement message and the virtual IP address included in the address advertisement message, to a server connected to the edge RB.

After receiving the address advertisement message sent by the first transit RB, the edge RB decapsulates the address advertisement message to acquire the virtual IP address and the virtual MAC address, and adds the correspondence between the virtual IP address and the virtual MAC address to the free ARP packet, and then sends, by broadcasting, on a traditional layer-2 network, the free ARP packet to the connected server.

It should be noted that, in this embodiment of the present invention, that a transit RB shares responsibility for a server connected to an edge RB is used as an example. In an actual application, a transit RB may share responsibility for multiple servers connected to an edge RB. A specific manner may be implemented by referring to an implementation manner of the method shown in the foregoing FIG. 3 and with reference to features of multiple edge RBs. Details are not repeatedly described herein.

With reference to implementation of the network architecture shown in FIG. 1 and the method shown in FIG. 3, the following describes two application scenarios of the embodiments of the present invention.

A first application scenario is described below.

In FIG. 1, the second transit RB is the transit RB1 and the first transit RB is the transit RB2. The transit RB1 is an active virtual gateway on the TRILL network, allocates a virtual MAC address 1 to itself and a virtual MAC address 2 to RB2, and sends a Nickname of the edge RB2 to the transit RB2. The transit RB2 will be connected to servers from a server 51 to a server 100 through the edge RB2. After receiving the Nickname of the edge RB2, the transit RB2 sends a virtual IP address and a virtual MAC address of the transit RB2 to the edge RB2 according to the Nickname of the edge RB2 by using an address advertisement message. After receiving the address advertisement message, the edge RB2 sends a correspondence between the virtual IP address of the transit RB2 and the virtual MAC address of the transit RB2 to the servers from the server 51 to the server 100 in a form of a free ARP packet. After receiving the free ARP packet, the servers from the server 51 to the server 100 separately establish an ARP entry that includes the correspondence between the virtual IP address and the virtual MAC address, and then the servers from the server 51 to the server 100 can send data packets to the first transit RB2 by using the ARP entries.

A second application scenario is described below.

In FIG. 1, the second transit RB is the transit RB1 and the first transit RB is the transit RB2. The transit RB1 is an active virtual gateway on the TRILL network, allocates a virtual MAC address 1 to itself, a virtual MAC address 2 to the transit RB2, and a virtual MAC address 3 to the transit RB3. In a normal condition, servers from a server 51 to a server 100 are connected to the transit RB2 through an edge RB2, and a server 101 to a server 150 are connected to the transit RB3 through the edge RB3. When the transit RB3 is faulty, the transit RB1 sends a Nickname of the edge RB3 to the transit RB2. After receiving the Nickname of the edge RB3, the transit RB2 sends a virtual IP address and a virtual MAC address of the transit RB2 to the edge RB3 according to the Nickname of the edge RB3 by using an address advertisement message. After receiving the address advertisement message, the edge RB3 sends a correspondence between the virtual IP address of the transit RB2 and the virtual MAC address of the transit RB2 to the servers from the server 101 to the server 150 in a form of a free ARP packet. After receiving the free ARP packet, the servers from the server 101 to the server 150 separately establish an ARP entry that includes the correspondence between the virtual IP address and the virtual MAC address. Then, the servers from the server 101 to the server 150 can send data packets to the first transit RB2 by using the ARP entries, thereby implementing proper connections between the servers from the server 101 to the server 150 and the TRILL network.

According to the foregoing technical solutions, on the TRILL network, the second RB sends a Nickname of an edge RB to the first RB, and the first transit RB sends, by unicasting, an address advertisement message to the edge RB according to the Nickname of the edge RB, where the address advertisement message includes a virtual IP address and a virtual MAC address of the first transit RB, so that the edge RB sends, after receiving the address advertisement message, on a traditional layer-2 network, by using a free ARP packet, a correspondence between the virtual IP address of the first transit RB and the virtual MAC address of the first transit RB to a server that accesses the TRILL network through the edge RB, thereby enabling the foregoing server to establish a connection to the first transit RB and access the TRILL network, and in comparison with the prior art, effectively reducing a quantity of messages sent for advertising addresses on the TRILL network and reducing occupation of TRILL network resources.

According to the method for sending a packet in this embodiment of the present invention, a virtual IP address and a virtual MAC address of a first transit RB can be encapsulated in a TRILL packet, an extended TRILL packet is sent, by unicasting, on a TRILL network, to an edge RB, and the edge RB sends, by broadcasting, on a traditional layer-2 network, a free ARP packet that carries a correspondence between the virtual IP address of the first transit RB and the virtual MAC address of the first transit RB to a server, which can effectively reduce a quantity of messages sent for advertising addresses on the TRILL network and reduce occupation of TRILL network resources.

Figure 5:
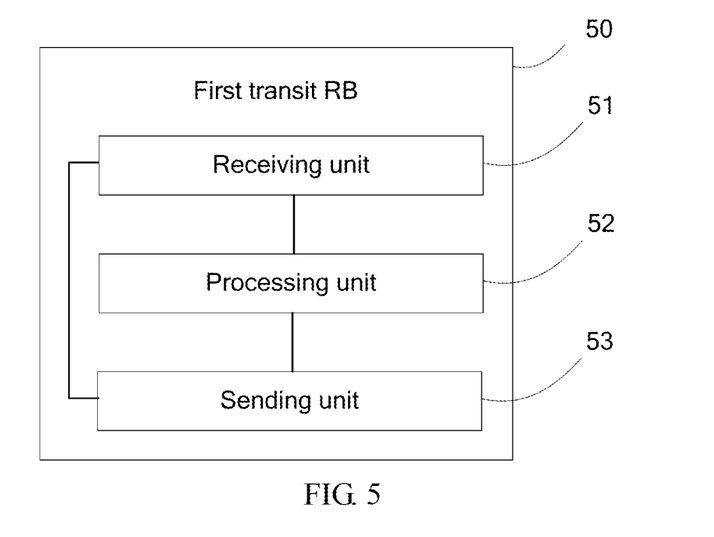
FIG. 5 is a schematic structural diagram of a first transit RB according to an embodiment of the present invention.

Referring to the implementation of the foregoing method embodiments, an embodiment of the present invention provides a first transit RB50, where the first transit RB50 is applicable to a TRILL network and the TRILL network includes the first transit RB50 and a second transit RB. As shown in FIG. 5, the first transit RB50 includes: a receiving unit 51, a processing unit 52, and a sending unit 53. The receiving unit 51 is configured to receive a Nickname of an edge RB sent by the second transit RB. The processing unit 52 is configured to construct an address advertisement message, where the address advertisement message includes a virtual IP address and a virtual MAC address of the first transit RB. The sending unit 53 is configured to send, according to the Nickname of the edge RB received by the receiving unit 51, the address advertisement message constructed by the processing unit 52 to the edge RB, so that the edge RB sends, after receiving the address advertisement message, a free ARP packet to a server that accesses the TRILL network through the edge RB, where the free ARP packet includes a correspondence between the virtual MAC address and the virtual IP address.

Further, the address advertisement message constructed by the processing unit 52 is an extended TRILL packet, and a specific extension manner of the extended TRILL packet is that the processing unit 52 adds the virtual IP address and the virtual MAC address to a Payload field of the extended TRILL packet.

Optionally, the address advertisement message is an extended TRILL packet, and a specific extension manner of the extended TRILL packet is shown in FIG. 4, where a TRILL Hdr field is a header of the TRILL packet, an SA (Source Address) field is a source address and is an address of the first transit RB50 in this embodiment of the present invention, a DA (Destination Address) field is a destination address and is filled with an address of the edge RB in this embodiment of the present invention, and the virtual IP address and the virtual MAC address are carried in a payload Payload field of the extended TRILL packet. When an Ethernet packet is also encapsulated in the extended TRILL packet, the virtual IP address and the virtual MAC address may be carried in a payload (Ethernet Payload) field of the Ethernet packet. When an Intermediate System to Intermediate System (IS-IS) packet is also encapsulated in the extended TRILL packet, the virtual IP address and the virtual MAC address may be carried in a payload (IS-IS Payload) field of the IS-IS packet.

Further, the first transit RB50 is an active virtual forwarder device on the TRILL network and the second transit RB is an active virtual gateway device on the TRILL network.

The Nickname of the edge RB is a user identifier of the edge RB and is used to uniquely identify the edge RB.

Optionally, the second transit RB may send the Nickname of the edge RB to the first transit RB50 by adding the Nickname of the edge RB in a payload (Payload) field of a TRILL packet.

The first transit RB50 saves in advance a unicast route that is based on the Nickname of the edge RB and sends the address advertisement message to the edge RB according to the unicast route. After receiving the address advertisement message, the edge RB advertises, in a form of a free ARP packet, the correspondence between the virtual MAC address included in the address advertisement message and the virtual IP address included in the address advertisement message, to a server connected to the edge RB. After receiving the free ARP packet, the server establishes an ARP entry that includes the correspondence between the virtual IP address and the virtual MAC address, and then the server can send a data packet to the first transit RB50 by using the ARP entry.

Optionally, a flag field may also be included in the Payload of the extended TRILL packet. When determining, after receiving the address advertisement message, that the flag field is included, the edge RB advertises, in a form of a free ARP packet, the correspondence between the virtual MAC address included in the address advertisement message and the virtual IP address included in the address advertisement message, to a server connected to the edge RB.

After receiving the address advertisement message sent by the first transit RB50, the edge RB decapsulates the address advertisement message to acquire the virtual IP address and the virtual MAC address, and adds the correspondence between the virtual IP address and the virtual MAC address to the free ARP packet, and then sends, by broadcasting, on a traditional layer-2 network, the free ARP packet to the connected server.

The first transit RB50 provided by this embodiment of the present invention can encapsulate a virtual IP address and a virtual MAC address of the first transit RB50 in a TRILL packet and send, by unicasting, on a TRILL network, the TRILL packet to an edge RB, and the edge RB sends, by broadcasting, on a traditional layer-2 network, a free ARP packet that carries a correspondence between the virtual IP address of the first transit RB50 and the virtual MAC address of the first transit RB50 to a server, which can effectively reduce a quantity of messages sent for advertising addresses on the TRILL network and reduce occupation of TRILL network resources.

Figure 6:
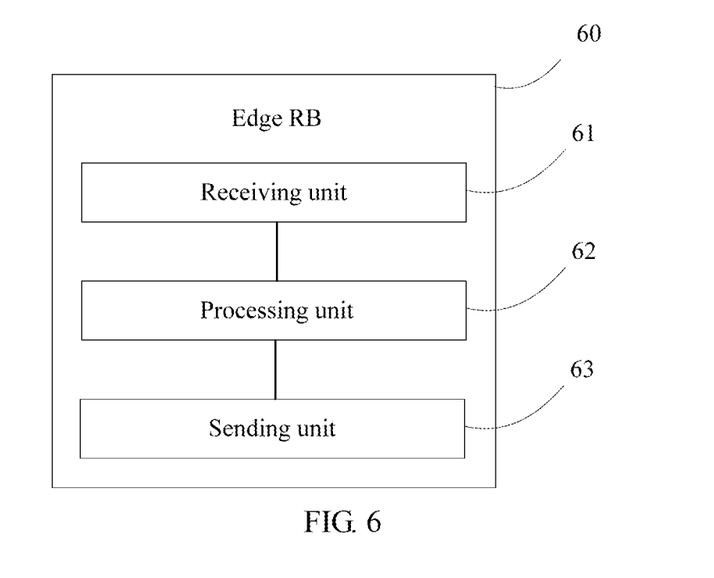
FIG. 6 is a schematic structural diagram of an edge RB according to an embodiment of the present invention.

Referring to the implementation of the foregoing method embodiments, an embodiment of the present invention provides an edge RB60, where the edge RB60 is applicable to a TRILL network. As shown in FIG. 6, the edge RB60 includes: a receiving unit 61, a processing unit 62, and a sending unit 63. The receiving unit 61 is configured to receive an address advertisement message sent by a transit RB, where the address advertisement message includes a virtual IP address and a virtual MAC address of the transit RB. The processing unit 62 is configured to construct a free ARP packet according to the address advertisement message, where the free ARP packet includes a correspondence between the virtual IP address and the virtual MAC address. The sending unit 63 is configured to send the free ARP packet constructed by the processing unit 62 to a server that accesses the TRILL network through the edge RB.

Optionally, the address advertisement message is an extended TRILL packet, and a specific extension manner of the extended TRILL packet is shown in FIG. 4, where a TRILL Hdr field is a header of the TRILL packet, an SA (Source Address) field is a source address and is an address of the transit RB in the embodiment of the present invention, a DA (Destination Address) field is a destination address and is filled with an address of the edge RB60 in the embodiment of the present invention, and the virtual IP address and the virtual MAC address are carried in a payload Payload field of the extended TRILL packet. When an Ethernet packet is also encapsulated in the extended TRILL packet, the virtual IP address and the virtual MAC address may be carried in a payload (Ethernet Payload) field of the Ethernet packet. When an Intermediate System to Intermediate System (IS-IS) packet is also encapsulated in the extended TRILL packet, the virtual IP address and the virtual MAC address may be carried in a payload (IS-IS Payload) field of the IS-IS packet.

The Nickname of the edge RB60 is a user identity of the edge RB60 and is used to uniquely identify the edge RB60.

The transit RB saves in advance a unicast route that is based on the Nickname of the edge RB and sends the address advertisement message to the edge RB60 according to the unicast route. After receiving the address advertisement message, the edge RB60 advertises, in a form of a free ARP packet, the correspondence between the virtual MAC address included in the address advertisement message and the virtual IP address included in the address advertisement message to a server connected to the edge RB60. After receiving the free ARP packet, the server establishes an ARP entry that includes the correspondence between the virtual IP address and the virtual MAC address, and then the server can send a data packet to the transit RB by using the ARP entry.

Optionally, a flag field may also be included in the Payload of the extended TRILL packet. When determining, after receiving the address advertisement message, that the flag field is included, the edge RB60 advertises, in a form of a free ARP packet, the correspondence between the virtual MAC address included in the address advertisement message and the virtual IP address included in the address advertisement message, to a server connected to the edge RB60.

After receiving the address advertisement message sent by the transit RB, the edge RB60 decapsulates the address advertisement message to acquire the virtual IP address and the virtual MAC address, and adds the correspondence between the virtual IP address and the virtual MAC address to the free ARP packet, and then sends, by broadcasting, on a traditional layer-2 network, the free ARP packet to the connected server.

The edge RB60 provided by this embodiment of the present invention receives an address advertisement message that is sent by the transit RB and carries a virtual IP address and a virtual MAC address, and sends, by broadcasting, on a traditional layer-2 network, a free ARP packet that carries a correspondence between the virtual IP address and the virtual MAC address of the transit RB to a server, which can effectively reduce a quantity of messages sent for advertising addresses on a TRILL network and reduce occupation of TRILL network resources.

Figure 7:
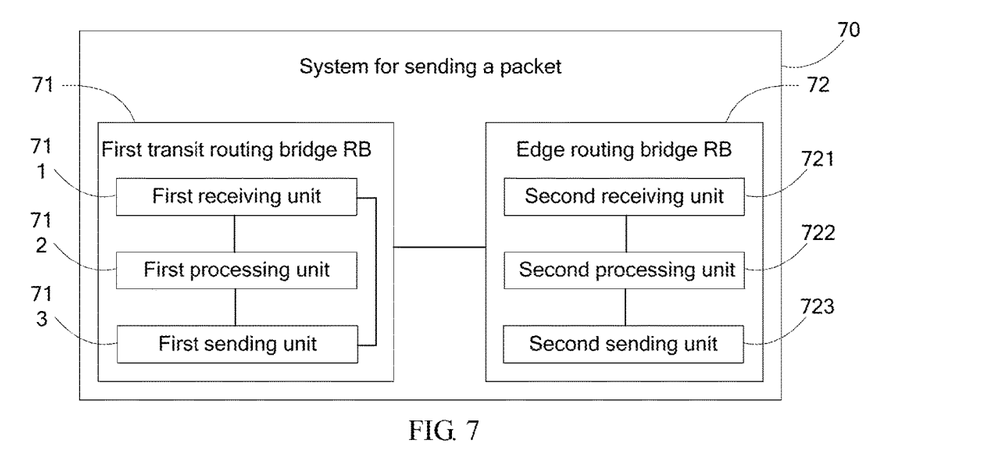
FIG. 7 is a schematic diagram of a system for sending a packet according to an embodiment of the present invention.

Further, an embodiment of the present invention provides a system 70 for sending a packet, where the system 70 is applicable to a TRILL network. As shown in FIG. 7, the system 70 includes: a first transit RB71 and an edge RB72. The first transit RB71 includes a first receiving unit 711 configured to receive a Nickname of the edge RB72 sent by a second transit RB; a first processing unit 712 configured to construct an address advertisement message, where the address advertisement message includes a virtual IP address and a virtual MAC address of the transit RB71; and a first sending unit 713 configured to send the address advertisement message to the edge RB72 according to the Nickname of the edge RB72 received by the first receiving unit 711. The edge RB72 includes a second receiving unit 721 configured to receive the address advertisement message sent by the first sending unit 713 of the first transit RB71; a second processing unit 722 configured to construct a free ARP packet according to the address advertisement message when determining that the address advertisement message received by the second receiving unit 721 includes a Nickname of the edge RB72. The free ARP packet includes a correspondence between the virtual IP address and the virtual MAC address. A second sending unit 723 is configured to send the free ARP packet constructed by the second processing unit 722 to a server that accesses the TRILL network through the edge RB72.

The system 70 for sending a packet according to this embodiment of the present invention can encapsulate a virtual IP address and a virtual MAC address of a first transit RB in a TRILL packet, and send, by unicasting, on a TRILL network, the TRILL packet to an edge RB, and the edge RB sends, by broadcasting, on a traditional layer-2 network, a free ARP packet that carries a correspondence between the virtual IP address of the first transit RB and the virtual MAC address of the first transit RB to a server, which can effectively reduce a quantity of messages for advertising addresses on the TRILL network and reduce occupation of TRILL network resources.

Figure 8:
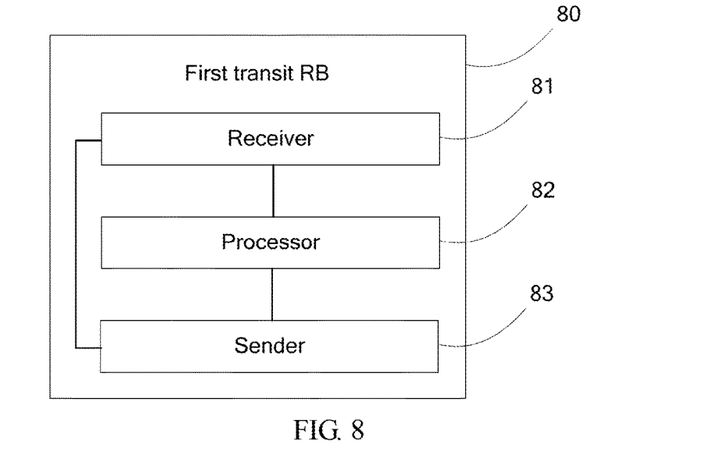
FIG. 8 is a schematic structural diagram of another first transit RB according to an embodiment of the present invention.

Further, an embodiment of the present invention provides a first transit RB80, where the first transit RB80 is applicable to a TRILL network and the TRILL network includes the first transit RB80 and a second transit RB. As shown in FIG. 8, the first transit RB80 includes: a receiver 81, a processor 82, and a sender 83. The receiver 81 is configured to receive a Nickname of an edge RB sent by the second transit RB. The processor 82 is configured to construct an address advertisement message, where the address advertisement message includes a virtual IP address and a virtual MAC address of the first transit RB. The sender 83 is configured to send, according to the Nickname of the edge RB received by the receiver 81, the address advertisement message constructed by the processor 82 to the edge RB, so that the edge RB sends, after receiving the address advertisement message, a free ARP packet to a server that accesses the TRILL network through the edge RB, where the free ARP packet includes a correspondence between the virtual MAC address and the virtual IP address.

Further, the address advertisement message constructed by the processor 82 is an extended TRILL packet, and a specific extension manner of the extended TRILL packet is that the processor 82 adds the virtual IP address and the virtual MAC address to a Payload field of the extended TRILL packet.

Further, the first transit RB is an active virtual forwarder device on the TRILL network and the second transit RB is an active virtual gateway device on the TRILL network.

The first transit RB80 provided by this embodiment of the present invention can encapsulate a virtual IP address and a virtual MAC address of the first transit RB80 in a TRILL packet and send, by unicasting, on a TRILL network, the TRILL packet to an edge RB, and the edge RB sends, by broadcasting, on a traditional layer-2 network, a free ARP packet that carries a correspondence between the virtual IP address of the first transit RB80 and the virtual MAC address of the first transit RB80 to a server, which can effectively reduce a quantity of messages sent for advertising addresses on the TRILL network and reduce occupation of TRILL network resources.

Figure 9:
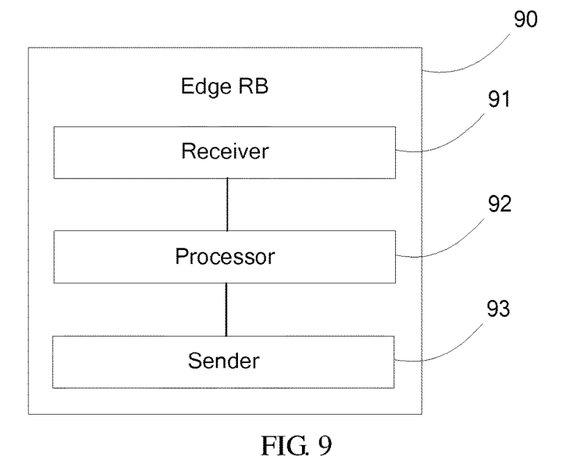
FIG. 9 is a schematic structural diagram of another edge RB according to an embodiment of the present invention.

Further, an embodiment of the present invention provides an edge RB90, where the edge RB90 is applicable to a TRILL network. As shown in FIG. 9, the edge RB90 includes: a receiver 91, a processor 92, and a sender 93. The receiver 91 is configured to receive an address advertisement message sent by a transit RB, where the address advertisement message includes a virtual IP address and a virtual MAC address of the transit RB. The processor 92 is configured to construct a free ARP packet according to the address advertisement message, where the free ARP packet includes a correspondence between the virtual IP address and the virtual MAC address. The sender 93 is configured to send the free ARP packet constructed by the processor 92 to a server that accesses the TRILL network through the edge RB90.

The edge RB90 provided by this embodiment of the present invention can receive an address advertisement message that is sent by the transit RB and carries a virtual IP address and a virtual MAC address, and send, by broadcasting, on a traditional layer-2 network, a free ARP packet that carries a correspondence between the virtual IP address of the transit RB and the virtual MAC address of the transit RB to a server, which can effectively reduce a quantity of messages sent for advertising addresses on a TRILL network and reduce occupation of TRILL network resources.

Figure 10:
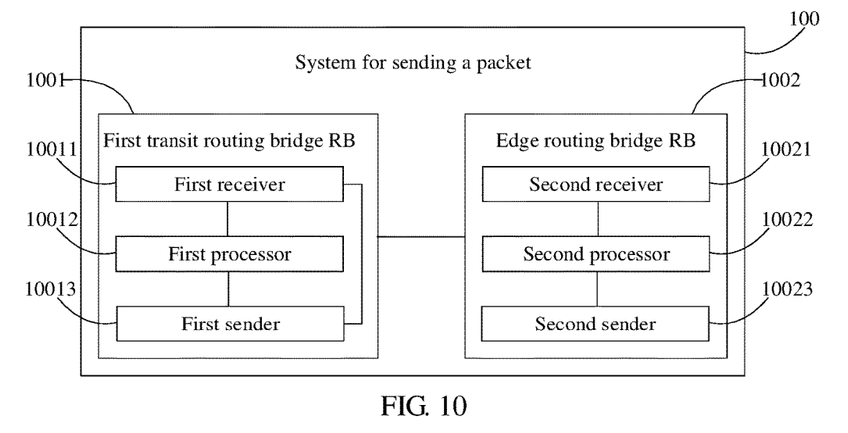
FIG. 10 is a schematic diagram of another system for sending a packet according to an embodiment of the present invention.

Further, an embodiment of the present invention provides a system 100 for sending a packet, where the system 100 is applicable to a TRILL network. As shown in FIG. 10, the system 100 includes: a first transit RB1001 and an edge RB1002. The first transit RB1001 includes a first receiver 10011 configured to receive a Nickname of the edge RB1002 sent by a second transit RB; a first processor 10012 configured to construct an address advertisement message, where the address advertisement message includes a virtual IP address and a virtual MAC address of the transit RB1001; and a first sender 10013 configured to send the address advertisement message to the edge RB1002 according to the Nickname of the edge RB1002 received by the first receiver 10011. The edge RB1002 includes a second receiver 10021 configured to receive the address advertisement message sent by the first sender 10013 of the first transit RB1001. A second processor 10022 is configured to construct a free ARP packet according to the address advertisement message, where the free ARP packet includes a correspondence between the virtual IP address and the virtual MAC address. A second sender 10023 is configured to send the free ARP packet constructed by the second processor 10022 to a server that accesses the TRILL network through the edge RB1002.

The system 100 for sending a packet according to this embodiment of the present invention can encapsulate a virtual IP address and a virtual MAC address of a first transit RB1001 in a TRILL packet, and send, by unicasting, on the TRILL network, the TRILL packet to an edge RB1002, and the edge RB1002 sends, by broadcasting, on a traditional layer-2 network, a free ARP packet that carries a correspondence between the virtual IP address of the first transit RB1001 and the virtual MAC address of the first transit RB1001 to a server, which can effectively reduce a quantity of messages sent for advertising addresses on the TRILL network and reduce occupation of TRILL network resources.

A person skilled in the art may clearly understand that, the division of the foregoing functional modules is merely used as an example for simple and concise description. In an actual application, the foregoing functions may be assigned as required to different functional modules for implementation, that is, an internal structure of an apparatus is divided into different functional modules, so as to implement all or a part of functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for exemplarily describing the technical solutions of the present invention other than limiting the present invention. Although the present invention and beneficial effects of the present invention are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of the present invention.

What is claimed is:

1. A method for sending a packet in a Transparent Interconnection of Lots of Links (TRILL) network, the method comprising:
   receiving, by a first transit routing bridge (RB), a Nickname of an edge RB sent by a second transit RB, the TRILL network comprising the first transit RB, the second transit RB, and the edge RB, wherein the first transit RB and the second transit RB share a same virtual IP address;
   constructing, by the first transit RB, an address advertisement message, wherein the address advertisement message comprises the virtual IP address shared by the first and the second transit RBs and a virtual MAC address of the first transit RB; and
   sending, by the first transit RB, according to the Nickname of the edge RB, the address advertisement message to the edge RB.

2. The method according to claim 1, wherein the edge RB is configured to send, after receiving the address advertisement message, a free Address Resolution Protocol (ARP) packet to a server that accesses the TRILL network through the edge RB, wherein the free ARP packet comprises a correspondence between the virtual MAC address and the virtual IP address.

3. The method according to claim 1, wherein the address advertisement message is an extended TRILL packet, and wherein the virtual IP address and the virtual MAC address are carried in a payload field of the extended TRILL packet.

4. The method according to claim 1, wherein the first transit RB is an active virtual forwarder device on the TRILL network and the second transit RB is an active virtual gateway device on the TRILL network.

5. The method according to claim 1, wherein, in the address advertisement message, the virtual IP address and the virtual MAC address are carried in a payload field.

6. A method for sending a packet in a Transparent Interconnection of Lots of Links (TRILL) network, the method comprising:
   receiving, by an edge routing bridge (RB), an address advertisement message sent by a transit RB, wherein the address advertisement message comprises a virtual IP address and a virtual MAC address of the transit RB, the TRILL network comprising the edge RB and the transit RB;
   constructing, by the edge RB, a free Address Resolution Protocol (ARP) packet, wherein the free ARP packet comprises a correspondence between the virtual IP address and the virtual MAC address; and
   sending, by the edge RB, the free ARP packet to a server that accesses the TRILL network through the edge RB.

7. The method according to claim 6, wherein the address advertisement message is an extended TRILL packet, and wherein the virtual IP address and the virtual MAC address are carried in a payload field of the extended TRILL packet.

8. The method according to claim 6, wherein the transit RB is an active virtual forwarder device on the TRILL network.

9. A first transit routing bridge (RB) for sending a packet using a Transparent Interconnection of Lots of Links (TRILL) network, the TRILL network comprises the first transit RB and a second transit RB, and the first transit RB comprises:
   a receiver configured to receive a Nickname of an edge RB sent by the second transit RB, wherein the first transit RB and the second transit RB share a same virtual IP address;
   a processor;
   a memory storing a program to be executed in the processor, the program comprising instructions configured to construct an address advertisement message, wherein the address advertisement message comprises the virtual IP address of the first and the second transit RBs and a virtual MAC address of the second transit RB; and
   a transmitter configured to send, according to the Nickname of the edge RB received by the receiver, the address advertisement message constructed by the processor to the edge RB.

10. The transit RB according to claim 9, wherein the edge RB is configured to send, after receiving the address advertisement message, a free Address Resolution Protocol (ARP) packet to a server that accesses the TRILL network through the edge RB, and wherein the free ARP packet comprises a correspondence between the virtual MAC address and the virtual IP address.

11. The transit RB according to claim 9, wherein the address advertisement message constructed by the processor is an extended TRILL packet, and wherein the virtual IP address and the virtual MAC address are carried in a payload field of the extended TRILL packet.

12. The transit RB according to claim 9, wherein the first transit RB is an active virtual forwarder device on the TRILL network and the second transit RB is an active virtual gateway device on the TRILL network.

13. The transit RB according to claim 9, wherein, in the address advertisement message, the virtual IP address and the virtual MAC address are carried in a payload field.

14. An edge routing bridge (RB) for sending a packet in a Transparent Interconnection of Lots of Links (TRILL) network, the edge RB comprising:
 a receiver configured to receive an address advertisement message sent by a transit RB, wherein the address advertisement message comprises a virtual IP address and a virtual MAC address of the transit RB, and wherein the TRILL network comprises the edge RB and the transit RB;
 a processor;
 a memory storing a program to be executed in the processor, the program comprising instructions configured to construct a free Address Resolution Protocol (ARP) packet according to the address advertisement message, wherein the free ARP packet comprises a correspondence between the virtual IP address and the virtual MAC address; and
 a transmitter configured to send the free ARP packet constructed by the processor to a server that accesses the TRILL network through the edge RB.

15. The edge RB according to claim 14, wherein the address advertisement message is an extended TRILL packet, and wherein the virtual IP address and the virtual MAC address are carried in a payload field of the extended TRILL packet.

16. The edge RB according to claim 14, wherein the transit RB is an active virtual forwarder device on the TRILL network.

17. A system for sending a packet in a Transparent Interconnection of Lots of Links (TRILL) network and the system comprises a first transit routing bridge (RB) and an edge RB, wherein:
 the first transit RB comprises:
  a first receiver configured to receive a Nickname of the edge RB sent by a second transit RB;
  a first processor;
  a first memory storing a first program to be executed in the first processor, the first program comprising instructions configured to construct an address advertisement message, wherein the address advertisement message comprises a virtual IP address and a virtual MAC address of the transit RB; and
  a first transmitter configured to send, according to the Nickname of the edge RB received by the first receiver, the address advertisement message to the edge RB; and
 the edge RB comprises:
  a second receiver configured to receive the address advertisement message sent by the first transmitter of the first transit RB;
  a second processor;
  a second memory storing a second program to be executed in the second processor, the second program comprising instructions configured to construct a free Address Resolution Protocol (ARP) packet according to the address advertisement message, wherein the free ARP packet comprises a correspondence between the virtual IP address and the virtual MAC address; and
  a second transmitter configured to send the free ARP packet constructed by the second processor to a server that accesses the TRILL network through the edge RB.

18. The system according to claim 17, wherein the address advertisement message is an extended TRILL packet, and wherein the virtual IP address and the virtual MAC address are carried in a payload field of the extended TRILL packet.

19. The system according to claim 17, wherein the first transit RB is an active virtual forwarder device on the TRILL network and the second transit RB is an active virtual gateway device on the TRILL network.

\* \* \* \* \*